(12) United States Patent
Khalil et al.

(10) Patent No.: US 9,207,345 B2
(45) Date of Patent: Dec. 8, 2015

(54) HYBRID DEBLENDING METHOD AND APPARATUS

(71) Applicant: CGG SERVICES SA, Massy (FR)

(72) Inventors: Adel Khalil, Aberdeen (GB); Gordon Poole, East Grinstead (GB); Margherita Maraschini, Swanley (GB)

(73) Assignee: CGG SERVICES SA, Massy (FR)

( * ) Notice: Subject to any disclaimer, the term of this patent is extended or adjusted under 35 U.S.C. 154(b) by 0 days.

(21) Appl. No.: 14/736,675

(22) Filed: Jun. 11, 2015

(65) Prior Publication Data
US 2015/0276958 A1     Oct. 1, 2015

Related U.S. Application Data

(63) Continuation of application No. PCT/IB2014/002820, filed on Oct. 31, 2014.

(60) Provisional application No. 62/016,109, filed on Jun. 24, 2014, provisional application No. 61/898,721, filed on Nov. 1, 2013.

(51) Int. Cl.
    *G01V 1/36*                 (2006.01)
    *G01V 1/34*                 (2006.01)

(52) U.S. Cl.
CPC ........ *G01V 1/364* (2013.01); *G01V 1/34* (2013.01); *G01V 2210/32* (2013.01)

(58) Field of Classification Search
CPC ...... G01V 1/34; G01V 1/364; G01V 2201/32
See application file for complete search history.

(56) References Cited

U.S. PATENT DOCUMENTS

| | | | |
|---|---|---|---|
| 6,882,938 B2 | 4/2005 | Vaage et al. | |
| 8,295,124 B2 | 10/2012 | Abma | |
| 8,395,966 B2 | 3/2013 | Moore et al. | |
| 2004/0233782 A1* | 11/2004 | Herkenhoff et al. | 367/47 |
| 2012/0044782 A1* | 2/2012 | Bekara | 367/24 |
| 2012/0215453 A1 | 8/2012 | Poole | |
| 2013/0176819 A1 | 7/2013 | Poole | |

FOREIGN PATENT DOCUMENTS

EP        2592439 A2      5/2013

OTHER PUBLICATIONS

International Search Report and Written Opinion of the International Searching Authority in related International Application No. PCT/IB2014/002810, mailed Apr. 8, 2015.
International Search Report and Written Opinion of the International Searching Authority in related International Application No. PCT/IB2014/002820, mailed Apr. 8, 2015.
R.L. Abma et al., "Separating Simultaneous Sources by Inversion", 71st EAGE Conference & Exhibition, Amsterdam, The Netherlands, Jun. 8-11, 2009, V002.

(Continued)

*Primary Examiner* — Phuong Huynh
(74) *Attorney, Agent, or Firm* — Patent Portfolio Builders PLLC

(57) ABSTRACT

Methods and devices for seismic data processing deblend seismic data gathered using simultaneous source acquisition by applying two different deblending techniques. The second deblending technique is applied to residual data obtained after applying the first deblending technique. At least one of these first and second deblending techniques uses a signal-to-noise map.

20 Claims, 12 Drawing Sheets

(56) References Cited

OTHER PUBLICATIONS

P. Akerberg et al., "Simultaneous Source Separation by Sparse Radon Transform", SEG Annual International Meeting, Las Vegas, Nevada, Nov. 9-14, 2008, pp. 2801-2806.

G. Beylkin, "Discrete Radon Transform", IEEE Transactions on Acoustic, Speech, and Signal Processing, Feb. 1987, ASSP-35, No. 2, pp. 162-172.

LL. Canales, "Random Noise Reduction", SEG 54th Annual International Meeting, 1984, pp. 525-527.

A. Canning et al., "Reducing 3-D Acquisition Footprint for 3-D DMO and 3-D Prestack Migration", GEOPHYSICS, Jul.-Aug. 1998, vol. 63, No. 4, pp. 1177-1183.

De Kok et al., "A Universal Simultaneous Shooting Technique", EAGE 64th Conference & Exhibition, Florence, Italy, May 27-30, 2002, A-04.

T.S. Durrani et al., "The Radon Transform and its Properties", GEOPHYSCIS, Aug. 1984, vol. 49, No. 8, pp. 1180-1187.

T. Elboth et al., "Time-Frequency Seismic Data De-noising", EAGE, Geophysical Prospecting, 2010, vol. 58, pp. 441-453.

N. Gulunay et al., "Coherency Enhancement on 3D Seismic Data by Dip Detection and Dip Selection", SEG Annual International Meeting, San Antonio, Texas, Sep. 23-28, 2007, pp. 2625-2629.

G. Hampson et al., "Acquisition Using Simultaneous Sources", The Leading Edge, Jul. 2008, pp. 918-923.

C.J. Haneveld et al., "A Fast Algorithm for the Computation of Radon Transforms", Geophysical Prospecting, 1990, vol. 38, pp. 853-860.

A. Mahdad et al., "Separation of Blended Data by Iterative Estimation and Subtraction of Blending Interference Noise", GEOPHYSICS, May-Jun. 2011, vol. 76, No. 3, pp. Q9-Q17.

M. Maraschini et al., "An Interative SVD Method for Deblending: Theory and Examples", SEG Technical Program Expanded Abstracts, 2012.

M. Marashini et al., "Source Separation by Iterative Rank Reduction—Theory and Applications", 74th EAGE Conference & Exhibition incorporating SPE EUROPEC 2012, Copenhagen, Denmark, Jun. 4-7, 2012.

I. Moore et al., "Simultaneous Source Separation Using Dithered Sources", SEG Annual International Meeting, Las Vegas, Nevada, Nov. 9-14, 2008, pp. 2806-2810.

C. Peng et al., "Deblending of Simulated Simultaneous Sources Using an Iterative Approach—an Experiment with Variable-depth Streamer Data", 75th EAGE Conference & Exhibition incorporating SPE EUROPEC 2013, London, UK, Jun. 10-13, 2013.

G. Poole et al., "A Deblending Strategy Using Alternating Constant Delay Simultaneous Source Data", SEG Annual International Meeting, Denver, Colorado, Oct. 26-31, 2014, pp. 4335-4339.

G. Poole, "Multi-dimensional Coherency Driven Denoising of Irregular Data", 73rd EAGGE Conference & Exhibition incorporating SPE EUROPEC 2011, Vienna, Austria, May 23-26, 2011, G009.

R. Soubaras, "Signal-Preserving Random Noise Attenuation by the f-x Projection", SEG 64th Annual International Meeting, 1994, pp. 1576-1579.

J. Stefani et al., "Acquisition Using Simultaneous Sources", EAGE 69th Conference & Exhibition, London, UK, Jun. 11-14, 2007, B006.

D. Trad et al., "Fast and Robust Deblending Using Apex Shifted Radon Transform", SEG Annual International Meeting, Las Vegas, Nevada, Nov. 4-9, 2012.

S. Trickett, "F-xy Eigenimage Noise Suppression", GEOPHYSICS, Mar.-Apr. 2003, vol. 68, No. 2, pp. 751-759.

S. Trickett et al., "Interpolation Using Hankel Tensor Completion", SEG Annual International Meeting, Houston, Texas, Sep. 22-27, 2013, pp. 3634-3638.

S. Trickett et al., "Robust Rank-Reduction Filtering for Erratic Noise", SEG Annual International Meeting, Las Vegas, Nevada, Nov. 4-9, 2012.

Australian Patent Examination Report No. 1 in related Australian Patent Application No. 2014343360, issued Oct. 9, 2015 (The three documents cited in this Examination Report were cited in the IDS filed Jun. 11, 2015.).

Canadian Requisition by the Examiner (2) and Examination Search Report in related Canadian Application No. 2,902,293, dated Oct. 5, 2015 (The two documents cited in these Requisitions by the Examiner were cited in the IDS filed Jun. 11, 2015.).

\* cited by examiner

Fig. 1A
Fig. 1B
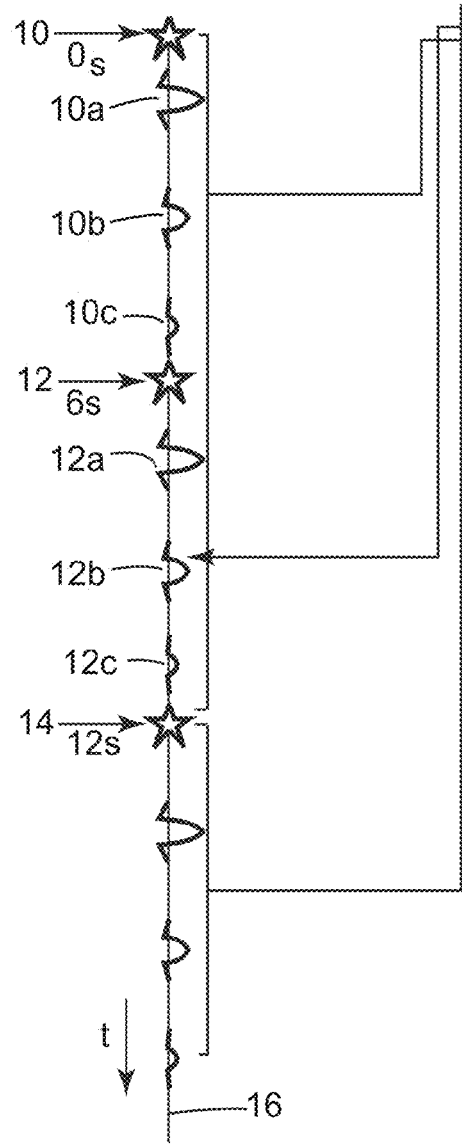
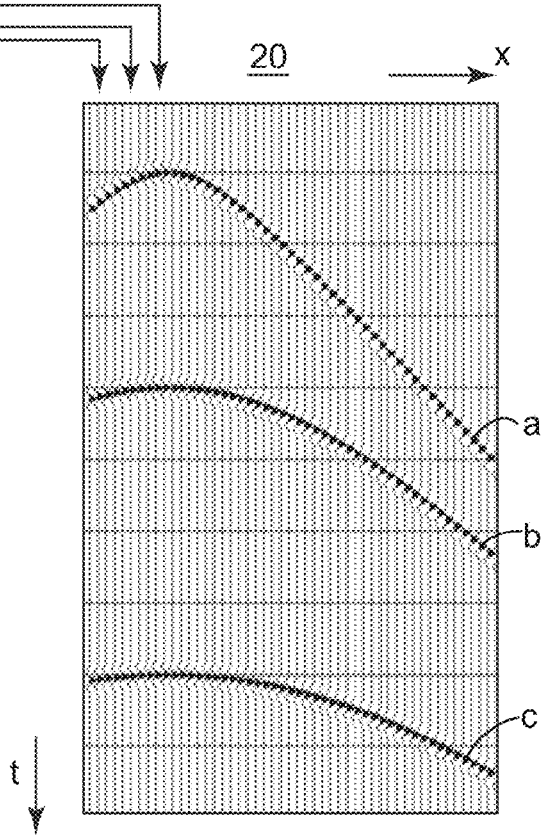

HYBRID DEBLENDING METHOD AND APPARATUS

CROSS REFERENCE TO RELATED APPLICATIONS

This application is Continuation Application of International Application No. PCT/IB2014/002820, filed on Oct. 31, 2014, which claims priority and benefit from U.S. Provisional Patent Application No. 62/016,109, filed Jun. 24, 2014, for "Hybrid Deblending: A method for deblending OBC/OBN datasets," and U.S. Provisional Patent Application No. 61/898,721, filed Nov. 1, 2013, for "Combined Cross Talk Attenuation and Source/Receiver Correction Using Continuous Recording Data," the contents of which are incorporated in their entirety herein by reference.

BACKGROUND

1. Technical Field

Embodiments of the subject matter disclosed herein generally relate to methods used for processing seismic data, and more particularly, to a hybrid deblending of seismic data using two different deblending techniques, for example, modeling denoising and impulsive denoising.

2. Discussion of the Background

Simultaneous source acquisition, which is characterized by an interval between shots (i.e., source activations to generate waves incident on an explored underground formation) shorter than listening time necessary to record energy due to one shot, is a desirable manner of acquiring seismic data because it reduces a survey's total acquisition time and cost, or it may be used to acquire a higher density dataset in the same survey time. Simultaneous source acquisition can be performed on land and in marine environments (with ocean bottom receivers or towed streamers), with continuous or non-continuous recording. Using simultaneous source acquisition yields blended data (i.e., including overlapping signals) and therefore requires additional pre-processing to extract seismic datasets focusing on individual signals, which is known as "deblending."

In conventional surveying techniques, sources are activated so a signal corresponding to one shot does not overlap another signal corresponding to another shot in their significant portions (e.g., when the ratio of the signals' amplitudes is substantially larger than each of the individual signal-to-noise ratios). FIG. 1A illustrates seismic waves generated at different spatial positions 10, 12 and 14 at intervals so recorded wavelets 10a-c corresponding to the seismic waves generated at spatial position 10 do not interfere with wavelets 12a-c corresponding to the seismic waves generated at spatial position 12. The wavelets generated due to one shot form a signal carrying information about the explored underground structure.

The receivers may record continuously in time (i.e., 16 in FIG. 1A) or separately to form regular seismic traces for each individual shot, as shown in FIG. 1B. The traces illustrated in FIG. 1B form a receiver gather 20. First wavelets, which correspond to reflections from a first interface, form curve a, second wavelets form curve b, etc.

FIG. 2A illustrates seismic waves generated at the same positions as in FIG. 1A, but at shorter intervals so the corresponding recording times partially overlap. Therefore, for example, wavelet 10c overlaps wavelet 12a. FIG. 2B shows receiver gather 30 formed with regular seismic traces extracted from continuous recording based on each shot's start time. FIG. 2B data has been acquired in less time than FIG. 1B data. Cross-talk such as 32, which appears to be noise on the traces, is in fact another trace's signal wavelet. When simultaneous source acquisition is used, it is necessary to separate (deblend) the energy (wavelets) associated with each shot as a pre-processing step.

In land simultaneous source acquisition, a variety of different sources (for example, different vibroseis sweeps or pseudo-random sweeps) yielding different signatures are used to ease separation of blended data. When energy from a given shot is time-aligned, a source designature operator for that shot can be applied to focus the energy related to that shot while keeping energy from other shots dispersed.

In marine acquisition, randomness of firing time of the sources (as described in the article, "A Universal Simultaneous Shooting Technique by DeKok et al., *EAGE 64th Conference & Exhibition* 2002, pp. 1-4, the entire content of which is incorporated herein by reference) may be used for deblending the data.

Varying shot timing (known as "timing dither"), which is seismic source activations at varying intervals, yields incoherency in cross-talk noise timing in all domains other than the shot domain. For example, FIG. 3 (corresponding to Hampson et al., "Acquisition using simultaneous sources", *Leading Edge*, Vol. 27, No. 7, the entire content of which is incorporated herein by reference) is a sequence of graphs representing the same blended seismic data in different domains: common shot, common receiver, common midpoint, and common offset.

Deblending techniques may be characterized into a number of classes. A first class attenuates blending noise by impulsive denoising, a second class uses a model (including using an inversion) of the data to perform deblending, a third class where deblending is achieved through joint modelling, or other methods (as described, for example, in "A deblending strategy using alternating constant delay simultaneous source data," by Poole et al., SEG 2014 conference and proceedings, the entire content of which is incorporated herein by reference).

Impulsive denoising techniques (disclosed, for example, in the article, "Acquisition using simultaneous sources," by Stefani et al., published in *69th EAGE Conference & Exhibition*, 2007, the entire content of which is incorporated herein by reference) use the fact that when data is sorted into any domain other than the common shot, cross-talk noise from other sources is incoherent, as illustrated in FIG. 3 (corresponding to the previously referred-to article of Hampson et al.). Note that in the common shot domain, cross-talk noise 40 is continuous. While these techniques may effectively remove the strongest cross-talk energy, low-amplitude cross-talk noise is not seen as impulsive and is not removed. Additionally these techniques are prone to signal damage.

Modeling and subtraction techniques are appealing when applied to a problem that is well-defined, but may fail when the cross-talk noise is too complex to be modeled.

Separation in a model domain may be used when the energy coming from different sources can be separated through muting in a model domain. For example, one such method (described in the article, "Fast and robust deblending using Apex Shifted Radon transform," by Trad et al., published in *SEG Expanded Abstracts* 2012, the entire content of which is incorporated herein by reference) uses an apex-shifted Radon to separate cross-talk noise.

Iterative coherency enhancement/denoising techniques (described, for example, in the article, "Separating simultaneous sources by inversion," by Abma et al., published in 71*st* EAGE Conference & Exhibition, 2009; the article, "Source Separation by Iterative Rank Reduction—Theory and Applications," by M. Maraschini et al., published in 74th *EAGE Conference & Exhibition*, 2012; and the article, "An iterative SVD method for deblending: theory and examples," by M. Maraschini et al., published in *SEG Technical Program Expanded Abstracts* 2012, the entire contents of which are incorporated herein by reference) rely on the fact that cross-talk noise on some traces is a duplication of signal on other traces. This means that with knowledge of the timing of all shots, a signal estimate made for one source can then be used to reduce the level of cross-talk for all other sources.

The full modeling of energy from all sources technique (described, for example, in the article, "Simultaneous source separation by sparse Radon transform," by Akerberg et al., published in 78*th Annual International SEG Meeting*, 2008; and the article, "Simultaneous source separation using dithered sources," by Moore et al., published in 78*th Annual International SEG Meeting*, 2008, the entire contents of which are incorporated herein by reference) has similarities to the iterative denoising method, except that this formulation solves the relationship between source energy and cross-talk noise implicitly at the core of the problem formulation. Equations can be formulated as designing a transform domain for each source or spatial area (e.g., tau-p domain, Fourier domain, etc.) such that when it is reverse-transformed and reblended, the raw input data is reconstructed as accurately as possible in a least squares sense.

This technique (i.e., full modeling of energy from all sources) uses the timing and positioning of all sources and also relies on a sparse solution to the equations. Once the transform domains have been calculated, the final step to deblend the data requires application of reverse-transform without reblending. While this method may result in some filtering of the original data, it removes low-amplitude cross-talk noise and preserves the primary signal. This method could be considered an alternative way of solving the same problem as the iterative coherency enhancement/denoising technique (analogous to sparse least squares Radon versus inversion through "iterative cleaning").

It is, however, desirable to develop deblending methods able to use the first and second class of deblending methods' strengths, while avoiding their pitfalls.

SUMMARY

Some of the embodiments described hereinafter deblend data by applying two different deblending techniques, the first deblending technique being applied to the data and the second deblending technique being applied to residual data obtained after applying the first deblending technique.

According to one embodiment, there is a method for deblending seismic data obtained when surveying an underground formation. The method includes receiving blended seismic data gathered using simultaneous source acquisition. The method further includes applying a first deblending technique to the blended seismic data, and applying a second deblending technique, to residual data resulting after applying the first deblending technique. The first deblending technique and the second deblending technique are different techniques. The method then includes creating an image of the explored underground formation using deblended data obtained by applying the first deblending technique and the second deblending technique.

According to another embodiment there is a data processing apparatus including an interface configured to receive blended seismic data gathered using simultaneous source acquisition, and a data processing unit. The data processing unit is configured to apply a first deblending technique to the blended seismic data, and to apply a second deblending technique to residual data obtained after applying the first deblending technique. The first deblending technique and the second deblending technique are different techniques. The data processing unit is further configured to obtain deblended data from the seismic data using results of applying the first deblending technique and the second deblending technique.

According to yet another embodiment there is a non-transitory computer readable medium storing executable codes which, when executed on a computer, makes the computer perform a method for deblending seismic data obtained when surveying an underground formation. The method includes applying a first deblending technique to blended seismic data gathered using simultaneous source acquisition. The method further includes applying a second deblending technique, to residual data resulting after applying the first deblending technique. The first deblending technique and the second deblending technique are different techniques. The method then includes creating an image of the explored underground formation using deblended data obtained from applying the first deblending technique and the second deblending technique.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 1A-B are graphical illustrations of seismic data without simultaneous acquisition;

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed in the context of seismic data processing and, in particular, deblending of land or marine seismic data resulting from simultaneous seismic data acquisition. However, similar methods may also be used to analyze datasets related to electromagnetic waves.

Reference throughout the specification to "one embodiment" or "an embodiment" means that a particular feature, structure or characteristic described in connection with an embodiment is included in at least one embodiment of the subject matter disclosed. Thus, the appearance of phrases "in one embodiment" or "in an embodiment" in various places throughout the specification is not necessarily referring to the same embodiment. Further, the particular features, structures or characteristics may be combined in any suitable manner in one or more embodiments.

Figure 2A:
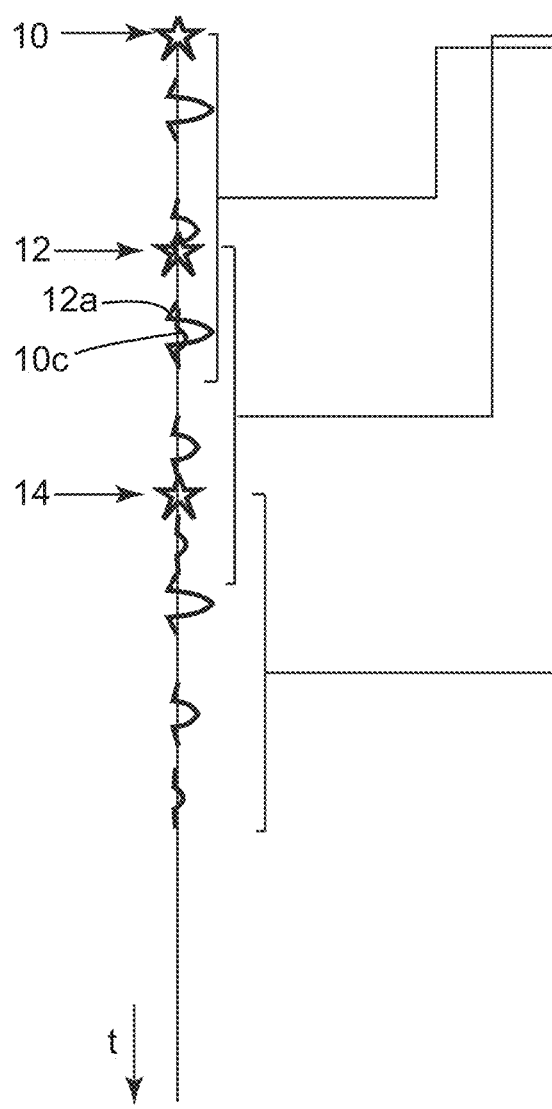
FIGS. 2A-B are graphical illustrations of blended seismic data.
Figure 2B:
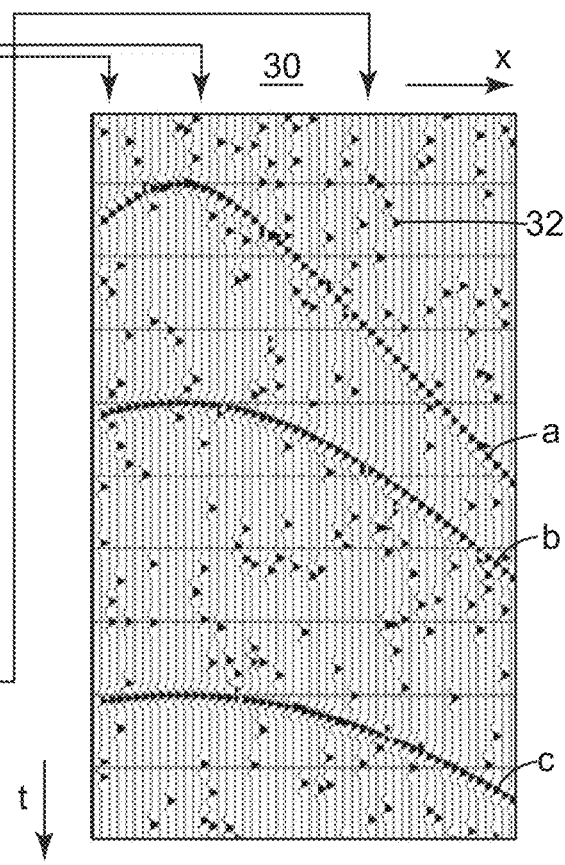
Figure 3:
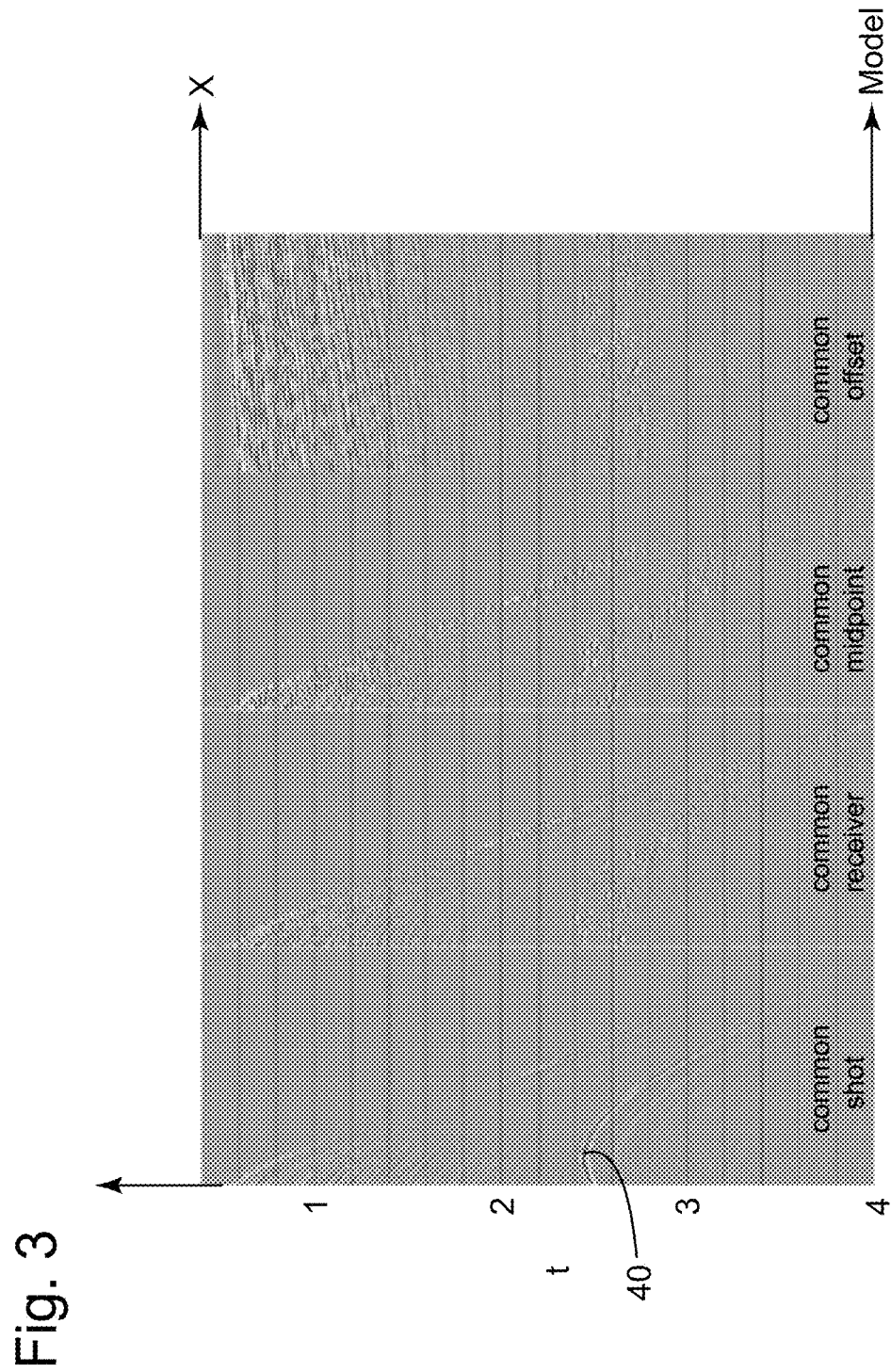
FIG. 3 is a graphical illustration of cross-talk in seismic data.
Figure 4:
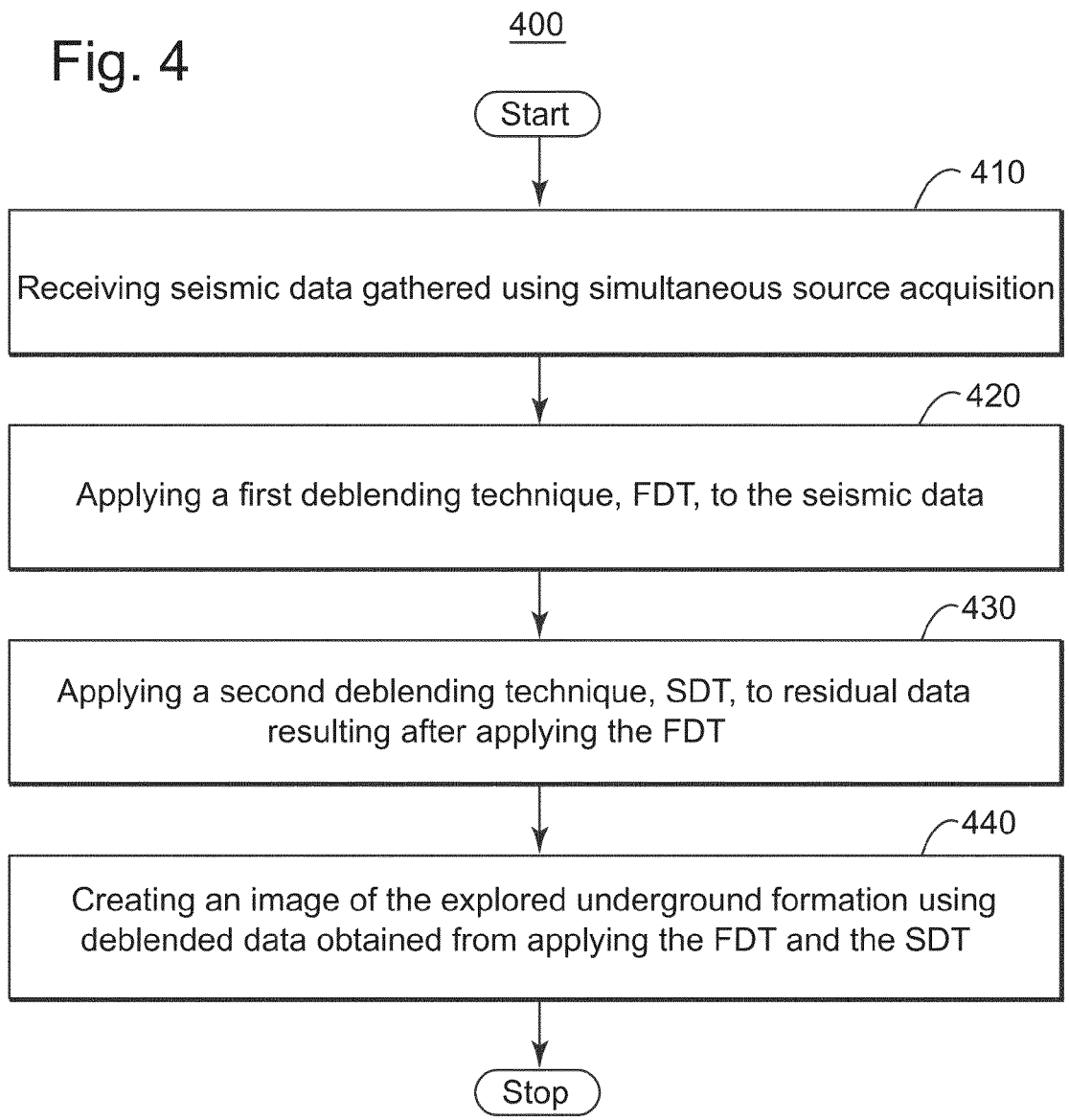
FIG. 4 is a flowchart of a method according to an embodiment.

FIG. 4 is a flowchart of a method 400 for deblending seismic data obtained when surveying an underground formation. Method 400 includes receiving seismic data gathered using simultaneous source acquisition at 410. Method 400 then includes applying a first deblending technique to the seismic data at 420. Looking again at FIG. 2B, besides inherent noise, in the case of blended data, noise is also due to energy from other shots and cross-talk leaking into the traces.

Method 400 further includes applying a second deblending technique to residual data resulting after applying the first deblending technique, at 430. The first and second deblending techniques are different techniques. For example, one may be a modeling type deblending, and the other may be an impulsive noise type deblending. Using different techniques leads to a synergetic combination enhancing the resulting deblended data's quality, while alleviating the pitfalls of each individual method.

In one embodiment, the first deblending technique yields a signal model and a noise model. In this case, residual data is obtained by subtracting data calculated using the signal and noise models, from the seismic data.

Method 400 further includes creating an image of the explored underground formation using deblended data obtained from applying the first and the second deblending techniques, at 440.

Method 400 may also include generating a signal-to-noise map for the seismic data, or its inverse i.e. noise-to-signal, which may be used when applying the first deblending technique and/or when applying the second deblending technique.

In one embodiment, the signal-to-noise map is generated by:
  weighting traces within a receiver gather with inverse of amplitudes;
  computing an envelope of the data based on the weighted traces;
  generating blended envelope data using acquisition shooting times; and
  populating the signal-to-noise map with predicted signal-to-noise ratios (SNR) based on a difference between the envelope of the data and the blended envelope data.

Figure 5:
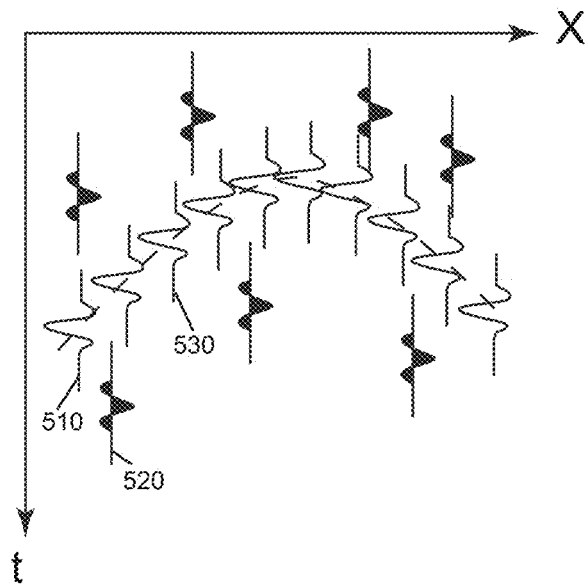
FIG. 5 illustrates traces of blended data.
Figure 6:
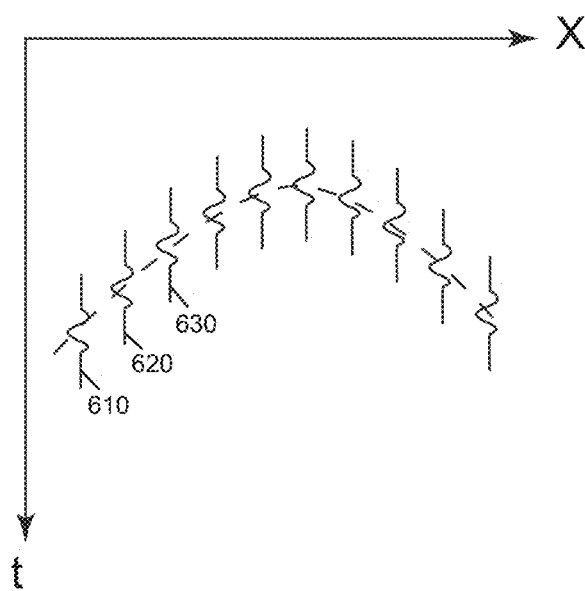
FIG. 6 illustrates the data in FIG. 5 where the traces have been heavily denoised using inverse amplitude weights.
Figure 7:
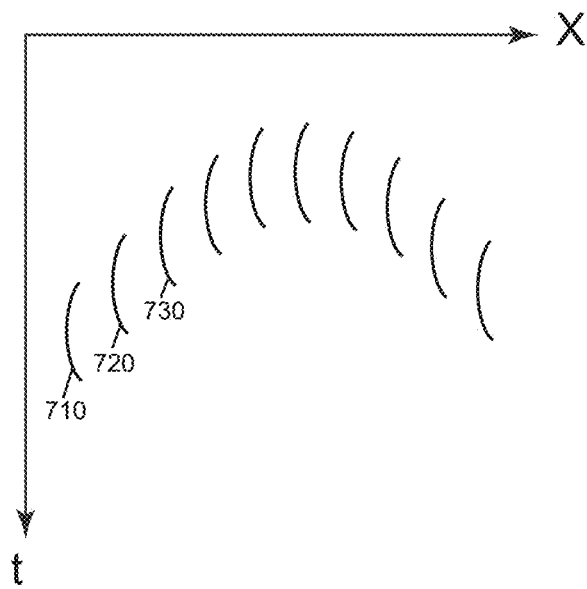
FIG. 7 illustrates envelopes of the signals in FIG. 6 computed using the Hilbert transform.
Figure 8:
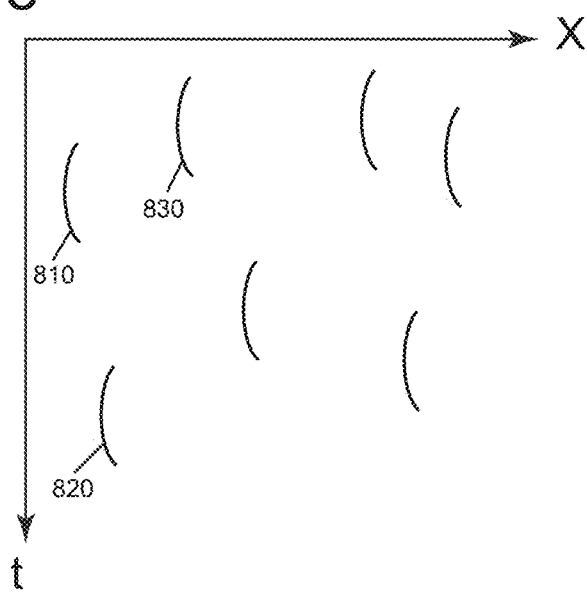
FIG. 8 illustrates the envelopes in FIG. 7 after being realigned based on shooting times.
Figure 9:
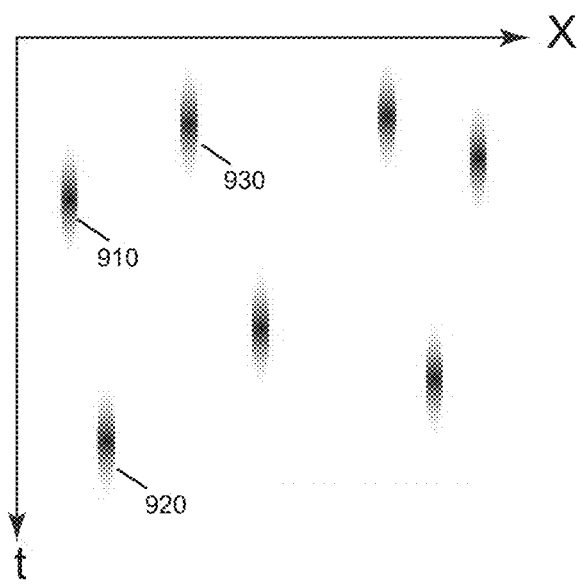
FIG. 9 is a signal-to-noise map.

A receiver gather is illustrated in the graph in FIG. 5, with time t on one axis and offset x on the other axis. Each line (e.g., 510, 520, 530; not all lines labeled) running from an x value down is a trace, and the trace wiggles correspond to the positive and negative amplitudes. FIG. 6 illustrates the same gather after the traces (e.g., 610, 620, 630) being heavily denoised using inverse amplitude weights. Further, FIG. 7 illustrates envelopes (e.g., 710, 720, 730) of the signals in FIG. 6 computed using the Hilbert transform, and FIG. 8 represents the envelopes (e.g., 810, 820, 830) after being realigned relative to the overlapping shooting times. FIG. 9 is a signal-to-noise ratio map obtained from FIG. 8 (note the areas 910, 920, 930, in FIG. 9 where signal is significant).

The first deblending technique may be an iterative projection filtering (IPF). When using the IPF, for every trace within a receiver gather, traces inside a user-defined radius from the trace are gathered and sorted according to their geographical positions (e.g., their distance to the receiver). The gathered traces are then weighted with the inverse of their amplitude and denoised using f-x projections filters, a singular value decomposition (SVD) denoising or another similar method. The process is repeated for every trace in the receiver gather.

After all the traces are denoised, yielding a signal model, the cleaned data is then time-aligned using the acquisition shooting times to create a noise model. The sum of the signal and noise models are then used to calculate data to be subtracted from the original input blended data to obtain the residual data. The IPF is repeated a number of times to minimize residual energy until a predetermined criterion is met. The predetermined criterion may be when no significant reduction in residual energy is observed.

The second deblending technique may be guided impulsive denoising (GID). Residual energy after applying a modeling type deblending likely includes both signal and noise. In GID, data in noisy regions is replaced with interpolated data. The noisy regions are identified/selected using the signal-to-noise map, for example, if the signal-to-noise map indicates that SNR associated with the noisy region (trace or data points in a spatio-temporal block) exceeds a user-defined noise level.

Figure 10:
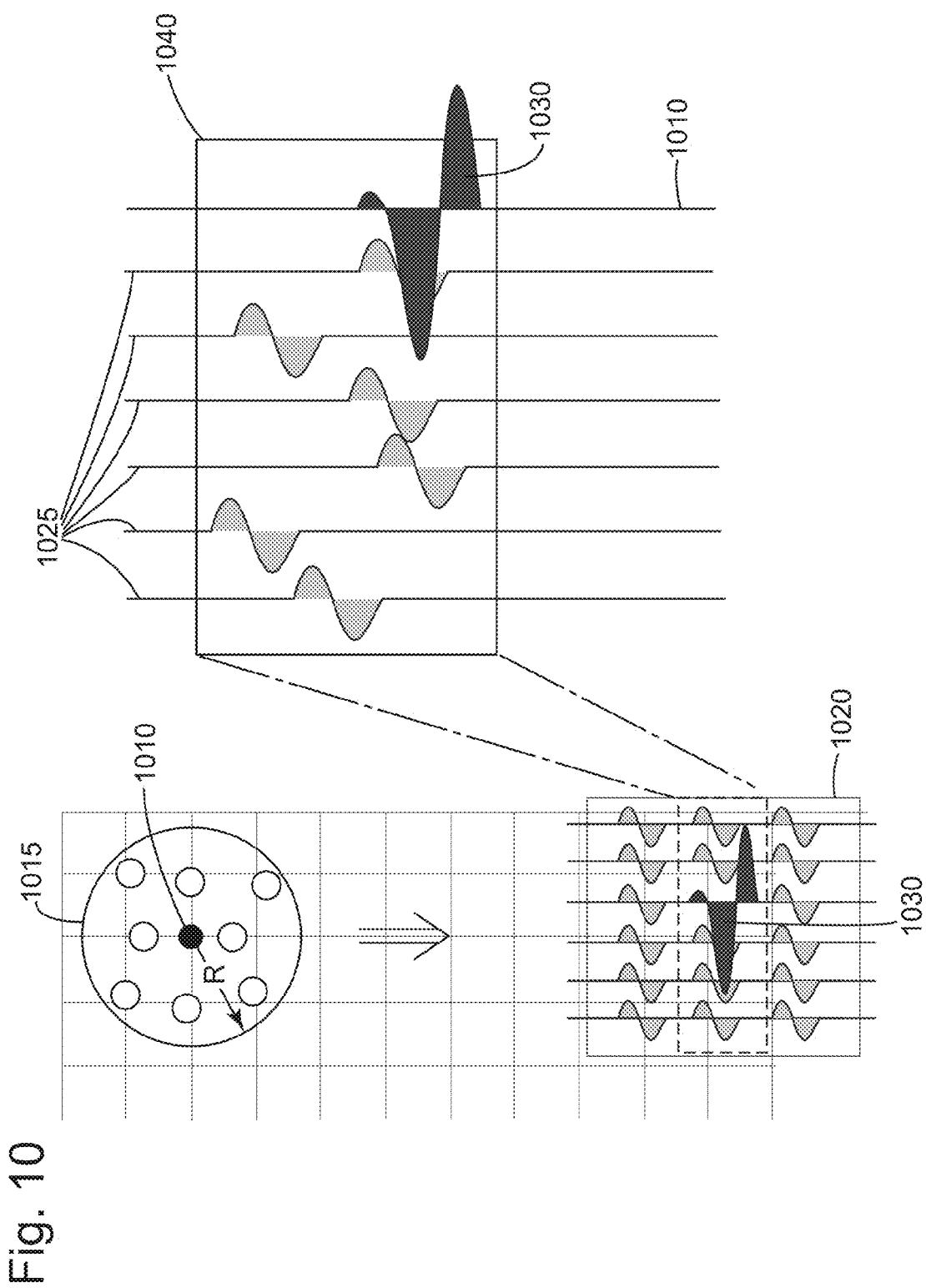
FIGS. 10-13 illustrate guided impulsive denoising according to an embodiment.

The interpolation method may be kriging with a primary f-k step (as described, for example, in "Geostatistics for Seismic Data Integration in Earth Models, Society of Exploration Geophysicists" a 2003 SEG publication, by O. Dubrule). Kriging or Gaussian process regression is a method of interpolation for which the interpolated values are modeled by a Gaussian process governed by prior covariances. This method is explained using FIGS. 10-13. FIG. 10 illustrates selecting traces neighboring a trace 1010, which has been identified as including a noisy region. Traces inside a circle 1115 having a predetermined radius R and being centered on trace 1010 are then selected. Graph 1020 (where vertical axis is time and horizontal axis is offset) illustrates the selected traces 1025, where 1030 is the noisy portion of trace 1010. Graph 1040 illustrates (blown-up from graph 1020) the portions of the selected traces 1025 that are used for interpolation to replace the noisy portion 1030 of trace 1010, which is removed. In graph 1040, the selected traces 1025 are arranged in order of their increasing offset (i.e., source-receiver distance).

Figure 11:
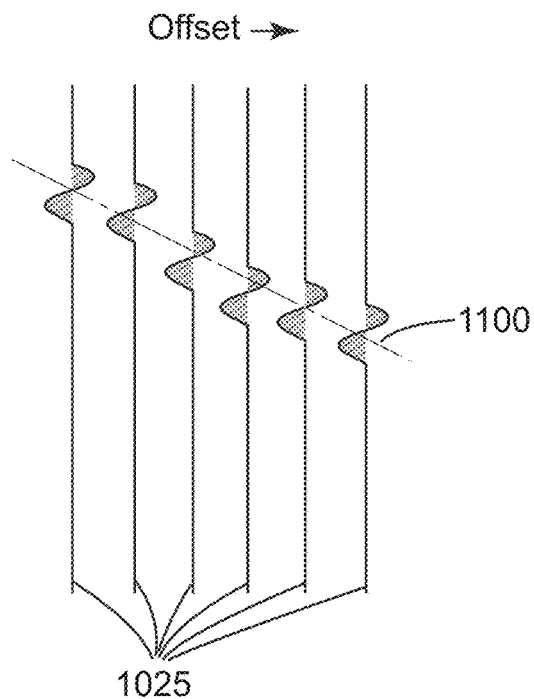
Figure 12:
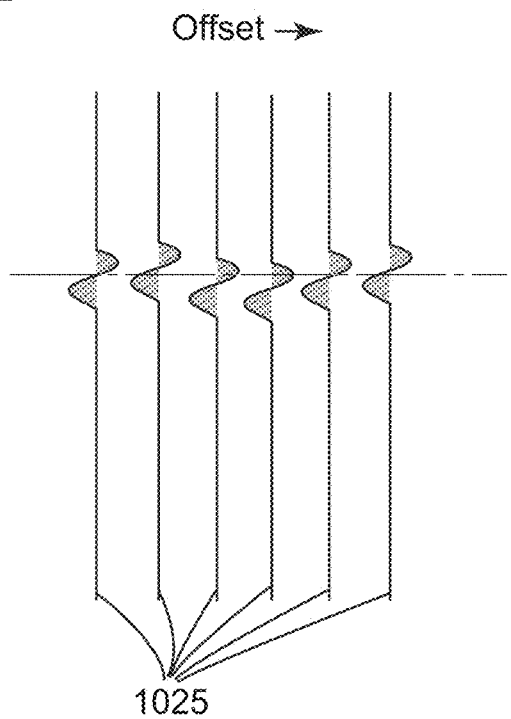
Figure 13:
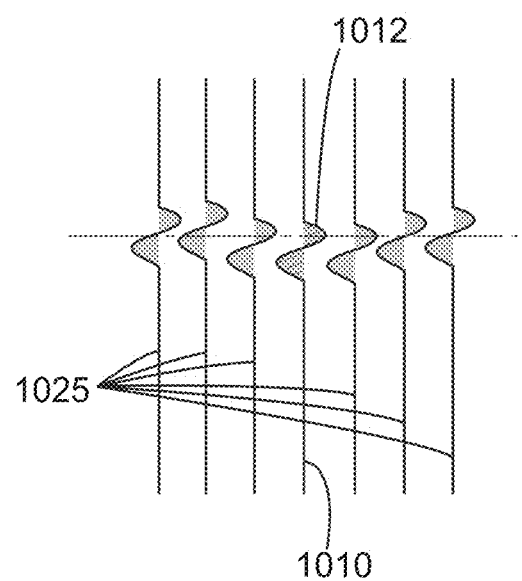

Further, a strongest velocity (the dashed line 1110) in FIG. 11, is extracted from an f-k spectrum of the sorted traces. The selected traces 1025 are then aligned using the strongest velocity as illustrated in FIG. 12. Amplitude and phase for wavelet 1012 (visible in FIG. 13) replacing the removed noisy portion 1030 on trace 1010 are evaluated using kriging. Time alignment of the selected traces 1025 (and trace 1010) is then reversed. Trace 1010 is thus denoised because the original noisy portion has thus been replaced as.

Figure 14:
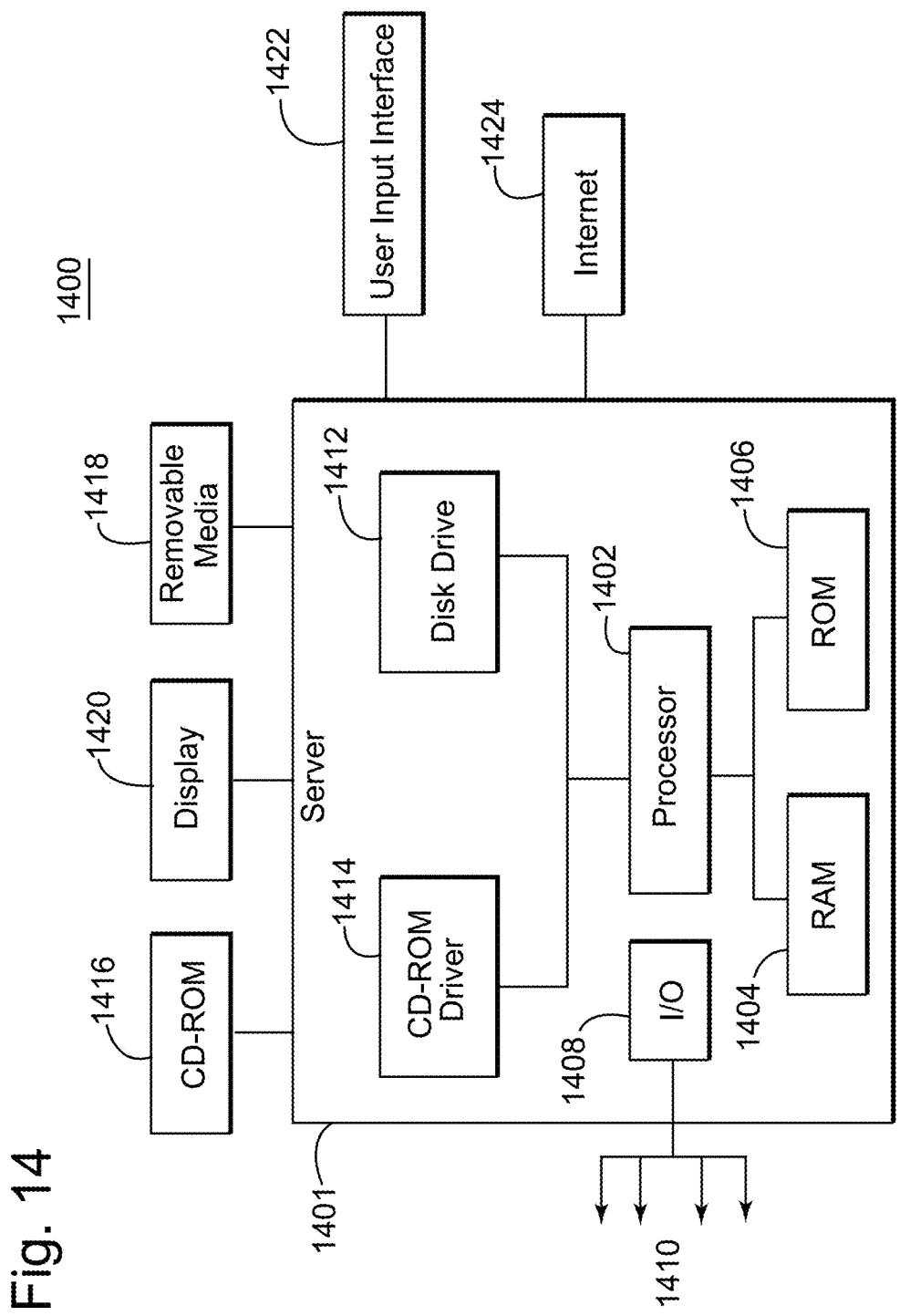
FIG. 14 illustrates a data processing apparatus according to an embodiment.

A schematic diagram of a seismic data processing apparatus 1400 configured to perform the methods according to various above-discussed embodiments is illustrated in FIG. 14. Hardware, firmware, software or a combination thereof may be used to perform the various steps and operations. Apparatus 1400 may include server 1401 having a data processing unit (processor) 1402 coupled to a random access memory (RAM) 1404 and to a read-only memory (ROM) 1406. ROM 1406 may also be other types of storage media to store programs, such as programmable ROM (PROM), erasable PROM (EPROM), etc. Methods according to various embodiments described in this section may be implemented as computer programs (i.e., executable codes) non-transitorily stored on RAM 1404 or ROM 1406.

Processor 1402 may communicate with other internal and external components through input/output (I/O) circuitry

1408 and bussing 1410. Input-output (I/O) interface 1408 is configured to receive the seismic data.

Processor 1402 carries out a variety of functions as are known in the art, as dictated by software and/or firmware instructions. Processor 1402 is configured to apply a first deblending technique, FDT, to the seismic data, and then to apply a second deblending technique, SDT, to residual data obtained after applying the FDT. The FDT and the SDT belong to different types among a modelling type and an impulsive noise type. Processor 1402 is further configured to obtain deblended data from the seismic data using results of applying the FDT and the SDT.

Server 1401 may also include one or more data storage devices, including disk drives 1412, CD-ROM drives 1414, and other hardware capable of reading and/or storing information, such as a DVD, etc. The seismic data, deblended data and the models may be stored in these data storage devices. In one embodiment, software for carrying out the above-discussed methods may be stored and distributed on a CD-ROM 1416, removable media 1418 or other forms of media capable of storing information. The storage media may be inserted into, and read by, devices such as the CD-ROM drive 1414, disk drive 1412, etc. Server 1401 may be coupled to a display 1420, which may be any type of known display or presentation screen, such as LCD, plasma displays, cathode ray tubes (CRT), etc. Server 1401 may control display 1420 to exhibit images of the explored subsurface formation. A user input interface 1422 may include one or more user interface mechanisms such as a mouse, keyboard, microphone, touch pad, touch screen, voice-recognition system, etc.

Server 1401 may be coupled to other computing devices, such as the equipment of a vessel, via a network. The server may be part of a larger network configuration as in a global area network such as the Internet 1424, which allows ultimate connection to various landline and/or mobile client/watcher devices.

The following embodiments which are designed to perform combined cross-talk attenuation and source/receiver correction using continuous recording data, may be used to determine a signal-to-noise map usable to guide one or both deblending techniques. In order to discuss these embodiments, definitions related to continuous recording are first presented to ease the description. Conventional seismic acquisition with an impulsive source consists of a source firing followed by energy recorded at the receivers. The time interval for all energy of interest associated with the source to reach the receivers is known as the "listening time" and includes time for the earth response plus the duration of the source signature. A recording acquired during a listening time is called a "trace," and lasts for about 4-10 seconds. Instead of separate recording for a fixed duration of time, it is also possible to record continuously while acquisition takes place. The concept of continuous recording is used extensively in land and ocean bottom survey (OBS) acquisition. Continuous recording is considered if the recording lasts at least as long as the listening time relating to a minimum of two separate source excitations (i.e., shots).

Iterative cross-talk attenuation methods according to various embodiments use continuous recording data, i.e., are applicable to any continuous recording dataset, marine, land, OBS (cable or node) or combination thereof. The seismic wave source may be impulsive (e.g., dynamite, air guns, pingers, boomers, etc.) or non-impulsive (e.g., vibroseis truck, marine vibrator, non-synchronized (sometimes termed "popcorn")). The methods are usable for hydrophone, geophone, accelerometer, or other recording systems, and are compatible with "encoded sources" where each source emits a different signal (including the case where each source may vary the signal it emits from shot to shot). If continuous recording data were interrupted, it may be reconstructed using segmented trace recordings, if all energy relating to the listening times has been recorded.

Data processing using a combined cross-talk attenuation and source/receiver correction method according to an embodiment is illustrated in FIG. 14.

The original blended data, $D_B$ (labeled 1510 in FIG. 15), is continuous recording data. A continuous recording may last as briefly as one hour or as long as several days. The sample interval is based on the maximum frequency of data to be recorded. The recording also stores information about the incident seismic waves. This information includes shot times (e.g., ms relative to the continuous recording trace), shot positions (i.e., as coordinates x, y or even also z if necessary, or, alternatively, midpoint coordinates), shot signatures (may be vertical signatures or directional signatures, can be constant for each source or vary from shot to shot) and shot-associated operators. Hereinafter, when referring to designature or resignature operators, optional corrections described below may be included.

The source signatures may include just the raw source response (e.g., air gun array effect or vibroseis sweep, which may optionally include vibroseis array effects if more than one vibrator is used). In marine data, source signatures may also include the source ghost. If ghost functions (vertical or directional) are included, the combined effects of deblending, source array compensation, and deghosting are corrected in a single process.

Shot static corrections may be included in the procedure by shifting the signatures. Applying these corrections may be of particular interest in the case of a non-horizontal datum (e.g., land or OBS) but also in the case of a non-homogenous near surface, etc.

Source amplitude variations may be related to coupling between the source and medium, which may be the case with land acquisition, in particular. Many algorithms are known in the field for estimating coupling coefficients. Once compensation filters are derived, they may be applied to the source signatures. In this case, the step of pseudo-deblending also re-applies the compensation filters. This correction is optional.

If filtering takes place across more than one receiver, analogous operations to those described above may be applied to the receiver side. Hereinafter, when referring to receiver response corrections, the following processes may be included:

a. compensation for receiver response (vertical or directional),
  b. receiver group summation response,
  c. receiver ghost (may relate to constant or variable receiver depth),
  d. receiver statics (analogous to source statics),
  e. receiver coupling filters (analogous to source amplitude variation), and
  f. receiver frequency response.

The pseudo-blended data, $D_{PD}$ (labeled 1520 in FIG. 15), is the original input data after applying signature and receiver response corrections followed by separation into traces, with trace length corresponding to listening time. As previously mentioned, an analogous correction may also be used on the receiver side.

The current denoised data $D_{DN}$ (labeled 1530 in FIG. 15) is input at each iteration of steps 3, 4.i, 4.ii and 4.iii. The current denoised data is obtained by subtracting the current cross-talk noise estimate, CN (labeled 1550 in FIG. 15) from the pseudo-deblended data, $D_{PD}$. The subtraction may be a straight subtraction or an adaptive subtraction, L2 norm, L1 norm, etc.

The current estimate of deblended data, $D_E$, (labeled 1540 in FIG. 15) is obtained after filtering the denoised data $D_{DN}$. Various usable denoising algorithms are discussed later. The current cross-talk CN (labeled 1550 in FIG. 15) is estimated at each iteration.

The method includes a pseudo-deblending operation (1) performed once when processing begins, operations (2), (3), (4.i), (4.ii) and (4.iii) are performed iteratively, and a final filtering operation (5) performed once at the end of processing. Each operation is described now in detail.

The pseudo-deblending operation (1) may be described by the following pseudo-code: (A) loop through shot excitation times, (B) loop through receivers, and (C) truncate the record to the earth response time.

When looping through shot excitation times, a listening time segment for the current shot (i.e., shot excitation time to shot excitation time plus the listening time) is extracted. Acquisition-related coordinates (e.g., shot-x, shot-y, receiver-x, receiver-y, midpoint-x, midpoint-y, inline, crossline, etc.) may be associated with this segment.

Further, designature (or adjoint resignature) based on the signature of the source as previously discussed is applied when looping through shot excitation times. This correction may include source array (group) response, source ghost, source static correction, amplitude correction, e.g., based on source coupling.

When looping through receivers, receiver response corrections (adjoint receiver response filters) may be applied. These corrections relate to receiver group response, receiver ghost, receiver static correction, and amplitude correction, e.g., based on receiver coupling.

The result of the pseudo-deblending operation (1) is a 2D or 3D volume of traces for each receiver, each trace being related to an individual shot and receiver position.

During operation (2), the cross-talk noise estimate CN resulting from a previous iteration of operations (2), (3), (4.i), (4.ii) and (4.iii) is subtracted from the pseudo-blended data $D_{PD}$ to obtain the current denoised data $D_{DN}$. In the first iteration, the cross-noise estimate is zero, so the denoised data $D_{DN}$ is the pseudo-deblended data $D_{PD}$. The current denoised data $D_{DN}$ is a "conservative estimate" of the blended dataset because it contains all the unblended signal (i.e., the theoretical data that would have been recorded in a non-blended acquisition) plus some cross-talk noise. With the iterations, the cross-talk noise component of $D_{DN}$ is reduced, and $D_{DN}$ converges to the deblended data $D_{DB}$ "from the top."

The filtering operation (3) removes cross-talk noise from the current denoised data $D_{DN}$ to obtain a current estimate of deblended data, $D_E$. The current estimate of deblended data $D_E$ is a "non-conservative estimate" of the deblended dataset because it does not contain any cross-talk noise, but does not preserve the entire unblended signal. With iterations, the unblended signal's energy is recovered more and more, and $D_E$ converges with the deblended data $D_{DB}$ "from the bottom."

This filter is a harsh process in the first iterations, retaining only the continuous events in the data. With successive iterations, filtering harshness may be relaxed. In one embodiment, the type of filter may be changed from iteration to iteration. Filtering may also remove the cross-talk energy and may include a combination of individual operations. A non-exhaustive list of filtering options includes: FK, POCS, FX prediction, FX projection, curvelet, wavelet, Radon, coherency, common reflection surface, temporal frequency, anti-leakage Fourier or tau-p transform or similar (as described, e.g., in the article, "Multi-dimensional coherency driven denoising of irregular data," by Poole, G., published in *EAGE conference proceedings,* 2011) rank reduction related methods (as described, e.g., in the article, "F-xy eigenimage noise suppression," by S. Trickett, published in Geophysics 68, 2003, pp. 751-759), rank reduction tensor methods (as described, e.g., in the article, "Interpolation using Hankel tensor completion," published in *SEG Technical Program Expanded Abstracts* 2013, pp. 3,634-3,638), robust rank reduction methods (as described, e.g., in the article, "Robust rank-reduction filtering for erratic noise," by S. Trickett et al., in SEG 2012), time frequency denoising (as described, e.g., in the article, "Time-frequency seismic data denoising," by Elboth et al., published in *Geophysical Prospecting* 58, 2010, pp. 441-453). All articles mentioned in this paragraph are incorporated in their entirety herein by reference.

The filter may include one or more spatial dimensions, depending on the geometry and on the filter method. For example, in the case of a towed streamer acquisition using two or more sources attached to the same vessel (often termed flip and flop sources) or to different vessels, it is possible to apply the denoising algorithm in 2D, in the common channel, common receiver, common cmp, or other domain where cross-talk noise may be largely non-continuous/coherent. Filtering may be applied successively using more than one algorithm either within one deblending iteration or a change of algorithm with iteration. The filters may be applied in different domains, for example, applying rank reduction filtering in the common channel domain followed by applying FK filtering in the receiver gather domain. The use of multi-dimensional spatial filtering (e.g. 3D) may also be used, for example, in the shot-channel domain. While the data from both sources is continuous in the shot domain, the use of the algorithm in this way ensures the noise model is consistent from channel to channel.

In another example, if in OBN acquisition shot positions provide 3D coverage, there are different flexibilities for filter application. For example, filtering may be applied in the inline direction followed by the crossline direction, or, 3D filtering may be directly applied.

The dimensions in which the filter is applied depend on the filter. The filter can be applied in subsets of the dataset, including temporal and spatial sub-windows, or sections (i.e., each line can be processed separately if required, for example, in the case of a towed streamer). The results from each sub-window may be combined, often using tapering.

The filter can be applied directly to $D_{DN}$, or it can be encompassed by a move-out correction and a reverse move-out correction. The use of a move-out correction (e.g., NMO or other corrections) may reduce the range of dips in the data, thus making it possible to constrain the filtering method (e.g., range of dips for a tau-p filter). By compensating for timing variations with offset, it may also be possible to constrain the filtering by using filters with similar properties for adjacent offsets.

Figure 15:
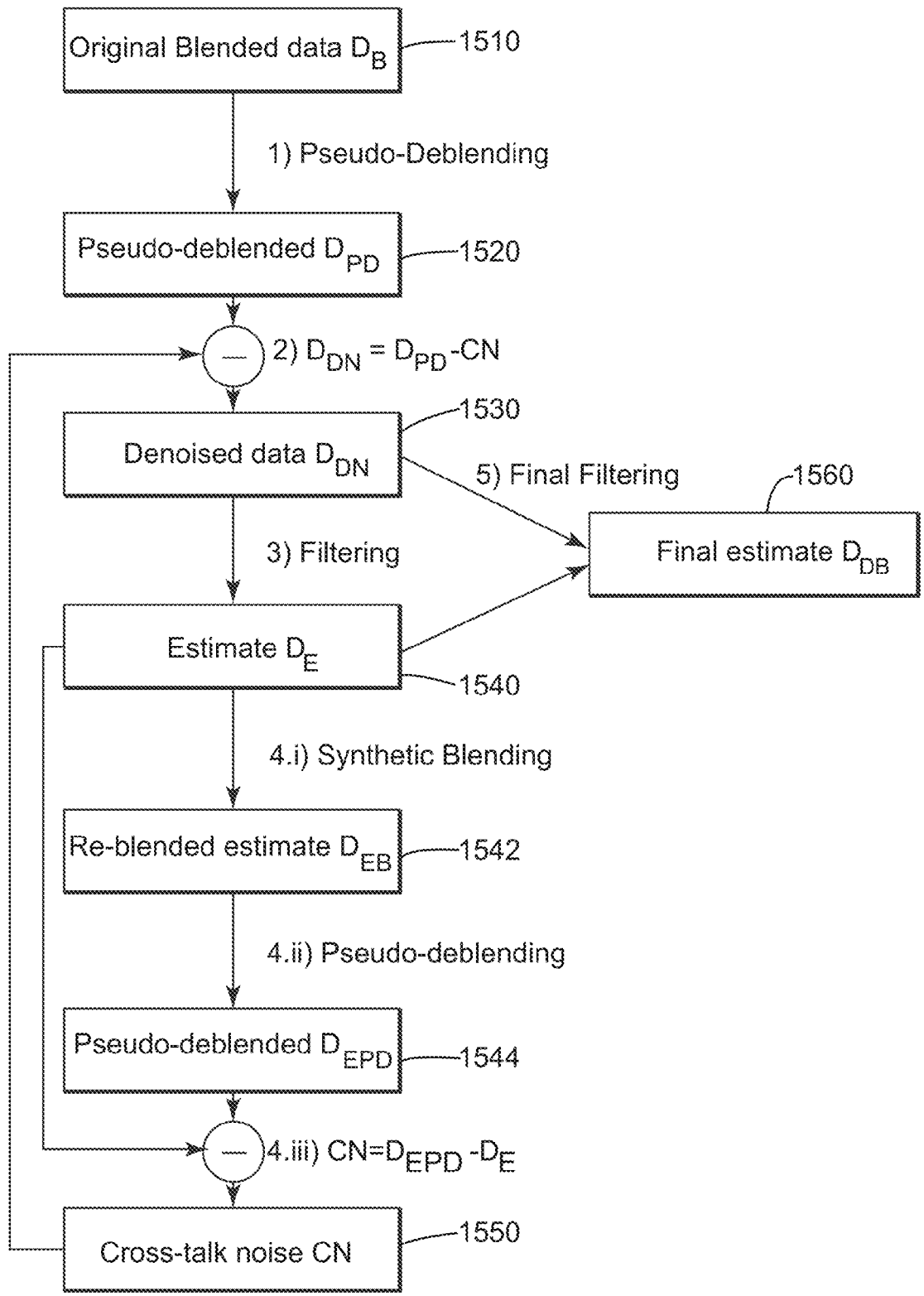
FIG. 15 illustrates a combined cross-talk attenuation and source/receiver correction method according to an embodiment.

The calculation of cross-talk estimate includes: synthetic blending (4.i), pseudo-deblending (4.ii) and calculating (4.iii) the difference between the re-blended estimate $D_{EB}$, (labeled 1542 in FIG. 15) and the pseudo-deblended data $D_{EPD}$, (labeled 1544 in FIG. 15).

Synthetic blending (4.i) relates to the adjoint of pseudo-deblending and may contain corrections analogous to those introduced in (1). Synthetic blending may involve re-blend/re-signature/receiver response corrections (including optional factors described earlier at the source and the receiver sides) applied to the earth response time records $D_E$ to form a continuous recording trace $D_{EB}$.

In one embodiment, the synthetic blending includes:
a. extending the earth response time records by the duration of the source signature and receiver response filters, so that the records have the length of the listening time;
b. convolving the extended records with the associated source signatures and receiver response operators; alternatively, this operation may be defined as the adjoint of designature and receiver response correction; in the frequency domain this step would relate to multiplication by the complex conjugate;
c. re-blending the data, by initializing a blank continuous recording record, and then looping through the shot firings to look up the firing time of the current shot, and adding in the record obtained in step b to the continuous recording trace.

Pseudo-deblending (4.ii) is similar to pseudo-deblending (1), and has estimate $D_E$ as input outputting the pseudo-deblended data $D_{EPD}$. Through iterations, the filter becomes less and less harsh until an iteration exit condition is met.

The current cross-talk noise $CN=D_{EPD}-D_E$ is then calculated and provided for a next subtraction operation (2).

The final filtering (5) occurs after the iteration exit condition is met. A final filter, for example, a frequency filter and/or a filter able to remove outliers, can be applied to the current denoised data $D_{DN}$ or to the estimate $D_E$, or to a combination of both to obtain the deblended data $D_{DB}$ (labeled 1560 in FIG. 15). The iteration exit conditions can be, for example: a maximum number of iterations is reached, the filter used during iteration becomes mild enough, or the difference between $D_{DN}$ and $D_E$ becomes small enough.

The above-outlined methods subtract more and more accurate cross-talk estimates from the pseudo-deblended data ($D_{PD}$) with successive iterations. This approach differs from an alternative algorithm where both the cross-talk noise and spatially consistent signal are played down with successive iterations. The methods may be performed by a dedicated data processing apparatus, and/or may be embodied into computer-executable codes non-transitorily stored on computer-readable storing media.

On a separate note, the generalized use of rank-reduction filtering, in particular the robust rank-reduction filtering and the rank-reduction filtering for erratic noise described in Trickett et al. 2012, and the rank-reduction filter using the Hankel tensor described in Trickett et al. 2013, can be used for cross-talk noise attenuation related to simultaneous shooting. While the above discussion relates to simultaneous shooting, the methodologies may also be applied to remove interference noise relating to the acquisition of a different survey going on nearby.

The disclosed embodiments provide methods and apparatus for deblending data acquired using simultaneous source acquisition. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in particular combinations, each feature or element may be usable alone without the other features and elements of the embodiments or in other various combinations with or without other features and elements disclosed herein.

The written description uses examples of the subject matter disclosed to enable any person skilled in the art to practice the same, including making and using the described devices or systems and performing any of the described methods. The patentable scope of the subject matter is defined by the claims, and may include other examples that occur to those skilled in the art. Such examples are intended to be within the scope of the claims.

What is claimed is:

1. A method for deblending seismic data obtained when surveying an underground formation, the method comprising:
receiving blended seismic data gathered using simultaneous source acquisition;
applying a first deblending technique, FDT, to the blended seismic data to calculate a signal model and a noise model;
calculating residual data by subtracting (i) data corresponding to the signal model and the noise model from (ii) the blended seismic data;
applying a second deblending technique, SDT, to the residual data resulting after applying the FDT; and
creating an image of the explored underground formation using deblended data obtained by applying the FDT and the SDT,
wherein the FDT and the SDT are different techniques.

2. The method of claim 1, further comprising:
generating a signal-to-noise map for the seismic data,
wherein the signal-to-noise map is used when applying the FDT and/or when applying the SDT.

3. The method of claim 2, wherein the signal-to-noise map is generated by:
computing a first dataset that is representative of signal energy;
computing a second dataset that is representative of noise energy using the acquisition shooting times; and
populating the signal-to-noise map with expected signal-to-noise ratios based on the first dataset and the second dataset.

4. The method of claim 1, wherein the FDT includes:
applying weights to the blended seismic data;
denoising the blended seismic data to obtain denoised data;
generating the signal model based on the denoised data;
creating the noise model using acquisition shooting times; and
calculating the residual data by subtracting data calculated using the signal model and the noise model, from the blended seismic data.

5. The method of claim 4, wherein the FDT is applied on the residual data until a predetermined criterion is met.

6. The method of claim 4, wherein the applying of the weights includes:
selecting traces found inside a pre-defined radius around a noisy trace identified based on the signal-to-noise ratio, and
weighting the selected traces with an inverse of their amplitude.

7. The method of claim 1, wherein the SDT is a guided impulsive denoising comprising:
generating a signal-to-noise map for the seismic data;
selecting noisy regions using the signal-to-noise map; and
replacing data in the noisy regions using interpolated data.

8. The method of claim 1, further comprising:
outputting a signal model obtained based on results of applying the FDT and results of applying SDT.

9. A data processing apparatus, comprising:
an interface configured to receive blended seismic data gathered using simultaneous source acquisition; and
a data processing unit configured
to apply a first deblending technique, FDT, to the blended seismic data to calculate a signal model and a noise model;
to calculate residual data by subtracting (i) data corresponding to the signal model and the noise model from (ii) the blended seismic data;
to apply a second deblending technique, SDT, to the residual data obtained after applying the FDT; and
to obtain deblended data from the seismic data using results of applying the FDT and the SDT,
wherein the FDT and the SDT are different techniques.

10. The apparatus of claim 9, wherein the data processing unit is further configured to generate a signal-to-noise map and to use the signal-to-noise map when applying the FDT and/or when applying the SDT.

11. The apparatus of claim 10, wherein the data processing unit generates the signal-to-noise map by:
computing a first dataset that is representative of signal energy;
computing a second dataset that is representative of noise energy using the acquisition shooting times; and
populating the signal-to-noise map with estimated signal-to-noise ratios based on the first dataset and second dataset.

12. The apparatus of claim 9, wherein the FDT includes:
applying weights to the blended seismic data;
denoising the blended seismic data to obtain denoised data;
generating the signal model based on the denoised data;
creating the noise model using acquisition shooting times; and
calculating residual data by subtracting data calculated using the signal model and the noise model, from the blended data.

13. The apparatus of claim 12, wherein the FDT is applied on the residual data until a predetermined criterion is met.

14. The apparatus of claim 12, wherein applying the weights includes:
selecting traces found inside a pre-defined radius around a noisy trace identified based on the signal-to-noise ratio, and
weighting the selected traces with an inverse of their amplitude.

15. The apparatus of claim 9, wherein the SDT is a guided impulsive denoising comprising:
generating a signal-to-noise map for the seismic data;
selecting noisy regions using the signal-to-noise map; and
replacing data in the noisy regions using interpolated data.

16. The apparatus of claim 9, wherein the data processing unit is further configured to obtain a signal model based on results of applying the FDT and results of applying SDT.

17. The apparatus of claim 16, wherein the data processing unit is further configured to create an image of the explored underground formation using the deblended data.

18. A non-transitory computer readable medium storing executable codes which, when executed on a computer, makes the computer perform a method for deblending seismic data obtained when surveying an underground formation, the method comprising:
applying a first deblending technique, FDT, to blended seismic data gathered using simultaneous source acquisition, to calculate a signal model and a noise model;
calculating residual data by subtracting (i) data corresponding to the signal model and the noise model from (ii) the blended seismic data;
applying a second deblending technique, SDT, to the residual data resulting after applying the FDT; and
creating an image of the explored underground formation using deblended data obtained from applying the FDT and the SDT,
wherein the FDT and the SDT are different techniques.

19. The medium of claim 18, further comprising:
generating a signal-to-noise map for the seismic data,
wherein the signal-to-noise map is used when applying the FDT and/or when applying the SDT.

20. The medium of claim 19, wherein the signal-to-noise map is generated by:
computing a first dataset that is representative of signal energy;
computing a second dataset that is representative of noise energy using the acquisition shooting times; and
populating the signal-to-noise map with expected signal-to-noise ratios based on the first dataset and the second dataset.

* * * * *